US008682936B2

(12) United States Patent
Bhattacharjee et al.

(10) Patent No.: US 8,682,936 B2
(45) Date of Patent: Mar. 25, 2014

(54) INHERITED ENTITY STORAGE MODEL

(75) Inventors: Koushik Bhattacharjee, Hyderabad (IN); Prabhat Kumar Pandey, Hyderabad (IN); David R. Shutt, Seattle, WA (US); Elliot S. Lewis, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 142 days.

(21) Appl. No.: 12/969,232

(22) Filed: Dec. 15, 2010

(65) Prior Publication Data

US 2012/0158757 A1 Jun. 21, 2012

(51) Int. Cl.
*G06F 7/00* (2006.01)
*G06F 17/00* (2006.01)
*G06F 17/30* (2006.01)

(52) U.S. Cl.
USPC .......................................... 707/802; 707/602

(58) Field of Classification Search
None
See application file for complete search history.

(56) References Cited

U.S. PATENT DOCUMENTS

| | | | |
|---|---|---|---|
| 5,692,106 A * | 11/1997 | Towers et al. .................... | 706/45 |
| 6,839,701 B1 | 1/2005 | Baer et al. | |
| 6,990,636 B2 | 1/2006 | Beauchamp et al. | |
| 7,313,561 B2 * | 12/2007 | Lo et al. ................................ | 1/1 |
| 7,606,782 B2 * | 10/2009 | Haley .............................. | 706/50 |
| 7,739,224 B1 * | 6/2010 | Weissman et al. ............ | 707/794 |
| 7,941,438 B2 * | 5/2011 | Molina-Moreno et al. ... | 707/756 |
| 8,005,459 B2 | 8/2011 | Balsillie | |
| 8,111,816 B2 | 2/2012 | Adamczyk et al. | |
| 2003/0097345 A1 | 5/2003 | Upton | |
| 2003/0145004 A1 * | 7/2003 | Egilsson et al. .................. | 707/6 |
| 2003/0193994 A1 * | 10/2003 | Stickler ......................... | 375/150 |
| 2005/0010892 A1 | 1/2005 | McNair et al. | |
| 2006/0073788 A1 | 4/2006 | Halkka et al. | |
| 2006/0074732 A1 | 4/2006 | Shukla et al. | |
| 2006/0085245 A1 | 4/2006 | Takatsuka et al. | |
| 2006/0179025 A1 | 8/2006 | Bechtel et al. | |
| 2006/0277082 A1 | 12/2006 | Behrendt et al. | |
| 2007/0038499 A1 | 2/2007 | Margulies et al. | |
| 2007/0185862 A1 | 8/2007 | Budzik et al. | |
| 2008/0097748 A1 * | 4/2008 | Haley et al. ....................... | 704/9 |
| 2009/0177754 A1 | 7/2009 | Brezina et al. | |
| 2009/0204470 A1 | 8/2009 | Weyl et al. | |
| 2009/0299811 A1 | 12/2009 | Verfuerth et al. | |

(Continued)

OTHER PUBLICATIONS

Chuck Ballard, Dimensional Modeling: In a Business Intelligence Environment, Mar. 2006, IBM Redbooks, pp. 176-188.*

(Continued)

*Primary Examiner* — Taelor Kim
(74) *Attorney, Agent, or Firm* — Wolfe-SBMC

(57) ABSTRACT

Techniques for an inherited entity storage model are described that can be employed to implement inherited entity management for a CRM system. In at least some embodiments, input can be obtained to create a custom entity that is based at least in part upon a parent entity. The custom entity is created to inherit the parent entity according to an inheritance relationship established between the entities. To do so, the custom entity is created from the parent entity in a common table with the parent entity using some common fields and defining custom fields as appropriate. Data for the entities is then stored via the common table. This approach can reduce storage requirements, enable unified searching, and speed up data operations. Further, back-end business logic associated with parent entity in the CRM system can be automatically applied to the custom entity based upon the inheritance relationship established between the entities.

15 Claims, 7 Drawing Sheets

(56) References Cited

U.S. PATENT DOCUMENTS

| | | | |
|---|---|---|---|
| 2010/0106747 A1* | 4/2010 | Honzal et al. | 707/803 |
| 2010/0145945 A1* | 6/2010 | Episale et al. | 707/736 |
| 2010/0223103 A1* | 9/2010 | Patel et al. | 705/10 |
| 2011/0213678 A1 | 9/2011 | Chorney | |
| 2011/0320411 A1* | 12/2011 | Henderson | 707/687 |
| 2012/0150751 A1 | 6/2012 | Pandey et al. | |
| 2012/0166244 A1 | 6/2012 | Raj et al. | |

OTHER PUBLICATIONS

"Migration to ADO.Net Entity Framework", Retrieved at << http://www.gersis-software.com/en/blog/migration-to-ADO.Net-entity-framework/ >>, Mar. 31, 2009, p. 1.

Berstein, et al., "Interactive Schema Translation with Instance-Level Mappings", Retrieved at <21 http://vldb.idi.ntnu.no/program/paper/demo/p1283-berstein.pdf >>, Seventh International Conference on Multi modal Interfaces, Oct. 4-6, 2005, pp. 1283-1286.

Hoffman, Kevin., "LINQ to Entities vs LINQ to SQL—What should I use and when?", Retrieved at << http://dotnetaddict.dotnetdevelopersjournal.com/adoef_vs_linqsql.htm >>, Aug. 17, 2006, pp. 12.

"Difference between LINQ to SQL and the Entity Framework", Retrieved at << http://dotnethitman.spaces.live.com/blog/cns!E1498B1E1C25B14!195.entry >>, Retrieved Date: Oct. 11, 2010, pp. 3.

Rezaei, Pedram., "Building an LINQ Provider", Retrieved at << http://msdn.microsoft.com/en-us/vcsharp/ee672195.aspx >>, Retrieved Date: Oct. 11, 2010, pp. 23.

"Approaches to CRM Integration", *WebEx Communications Inc.*, Available at <http://developerwebex.com/c/document_library/get_file?folderId=11421&name=DLFE-217.pdf>,(2005),pp. 1-6.

"CRM for SYSPRO", *SYSPRO*, Available at <http://whitehoppe.com/Solutions/Syspro/Syspro_CRM_2010.pdf>,(2010),10 pages.

"CRM Information Workflows", Retrieved from: <http://crm.ebsuite.com/iPrd_CRM_EBSuite_Workflows.shtml> on Oct. 11, 2010, (Nov. 2, 2007),2 pages.

"Processes in CRM 2011 Prompt and Response Dialogs", Retrieved from: <http://www.powerobjects.com/blog/2010/09/30/processes-in-crm-2011-prompt- and-response-dialogs/> on Oct. 11, 2010, (Sep. 30, 2010),5 pages.

Atef, Mohammed "Mohammed Atef's Technical blog", Retrieved from: <http://mohammedatef.wordpress.com/tag/workflow/> on Oct. 11, 2010, (Feb. 5, 2009),30 pages.

Hogue, David "Modeling User Workflows for Rich Internet Applications", Retrieved from: <http://www.adobe.com/devnet/flash/articles/ria_workflow.html#articlecontentAdobe_numberedheader_0> on Oct. 11, 2010, (Jan. 17, 2005),12 pages.

Milner, Matt "A Developers Introduction to Windows Workflow Foundation (WF) in .NET 4", Retrieved from: <http://msdn.microsoft.com/en-us/library/ee342461.aspx> on Oct. 11, 2010, (Nov. 2009),47 pages.

Tejada, Zoiner "WF Scenarios Guidance: Presentation Flow", Retrieved from: <http://msdn.microsoft.com/en-us/library/dd557867.aspx> on Oct. 11, 2010,(Mar. 2009),11 pages.

Tous, Andy "Dialog Workflow Component Flow Logic", Retrieved from: <http://www.symantec.com/connect/blogs/dialog-workflow-component-flow-logic>on Oct. 11 2010, (Feb. 17, 2009),2 pages.

"Design Details Workflow modeling components", Retrieved from: <http://samples.netfx3.com/PadeflowHelp/DesignDetails.aspx> on Oct. 11, 2010,(2007),7 pages.

"Entity Inheritance", Retrieved from: <http://docs.sun.com/app/docs/doc/819-3669/bnbqn?l=en&a=view> on Oct. 11, 2010, The JAVA EE 5 Tutorial, Sun Microsystems,(Oct. 2008),3 pages.

"Non-Final Office Action", U.S. Appl. No. 12/967,877, (Oct. 11, 2012),16 pages.

Rezaei, Pedram "Building a LINQ Provider", Retrieved from: <http://msdn.microsoft.com/en-us/vcsharp/ee672195.aspx> on Oct. 11, 2010, 23 pages.

Saha, Pankaj "ADO.NET Entity Framework", Retrieved from: <http://sahapankaj.blogspot.com/2009/07/adonet-entity-framework.html> on Oct. 11, 2010 (Jul. 20, 2009),25 pages.

"Final Office Action", U.S. Appl. No. 12/967,877, (Feb. 15, 2013), 21 pages.

"Non-Final Office Action", U.S. Appl. No. 12/980,152, (Dec. 5, 2012), 15 pages.

"Final Office Action", U.S. Appl. No. 12/980,152, (Jun. 13, 2013), 12 pages.

* cited by examiner

INHERITED ENTITY STORAGE MODEL

BACKGROUND

Through a customer relationship management (CRM) system, clients may be provided with resources to manage a variety of customer centric business processes, such as sales opportunities, product marketing, service calls, project management, and so forth. One traditional technique for management of business processes involves using transactional databases in which various entities such as contacts, customers, products, appointments, email, and so forth are modeled using different tables for different entities. Interdependencies between different tables can be achieved by creating joins between the tables. This approach, although effective for a relatively simple set of entities, can make it difficult to implement more complex entity relationships. Moreover, storing entities via different tables causes duplication of fields for common attributes and can lead to proliferation of table joins because similarities between entities are not accounted for in the database structure.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques for an inherited entity storage model are described that can be employed to implement inherited entity management for a CRM system. In at least some embodiments, input can be obtained to create a custom entity that is based at least in part upon a parent entity. The custom entity is created to inherit the parent entity according to an inheritance relationship established between the entities. To do so, the custom entity is created from the parent entity in a common table with the parent entity using some common fields and defining custom fields as appropriate. Data for the entities is then stored via the common table. This approach can reduce storage requirements, enable unified searching, and speed up data operations. Further, back-end business logic associated with parent entity in the CRM system can be automatically applied to the custom entity based upon the inheritance relationship established between the entities.

BRIEF DESCRIPTION OF THE DRAWINGS

The same numbers are used throughout the drawings to reference like features.

DETAILED DESCRIPTION

Overview

Techniques for an inherited entity storage model are described that can be employed to implement inherited entity management for a CRM system. In at least some embodiments, input can be obtained to create a custom entity that is based at least in part upon a parent entity. The custom entity is created to inherit the parent entity according to an inheritance relationship established between the entities. To do so, the custom entity is created from the parent entity in a common table with the parent entity using some common fields and defining custom fields as appropriate. Data for the entities is then stored via the common table. This approach can reduce storage requirements, enable unified searching, and speed up data operations. Further, back-end business logic associated with parent entity in the CRM system can be automatically applied to the custom entity based upon the inheritance relationship established between the entities.

In the discussion that follows, a section titled "Operating Environment" is provided and describes one environment in which one or more embodiments can be employed. Following this, a section titled "Inherited Entity Storage Model Examples" describes example aspects of the storage model in accordance with one or more embodiments. Next, a section titled "Example Methods" describes example techniques for an inherited entity storage model in accordance with one or more embodiments. Last, a section titled "Example System" describes example computing systems and devices that can be utilized to implement one or more embodiments.

Operating Environment

Figure 1:
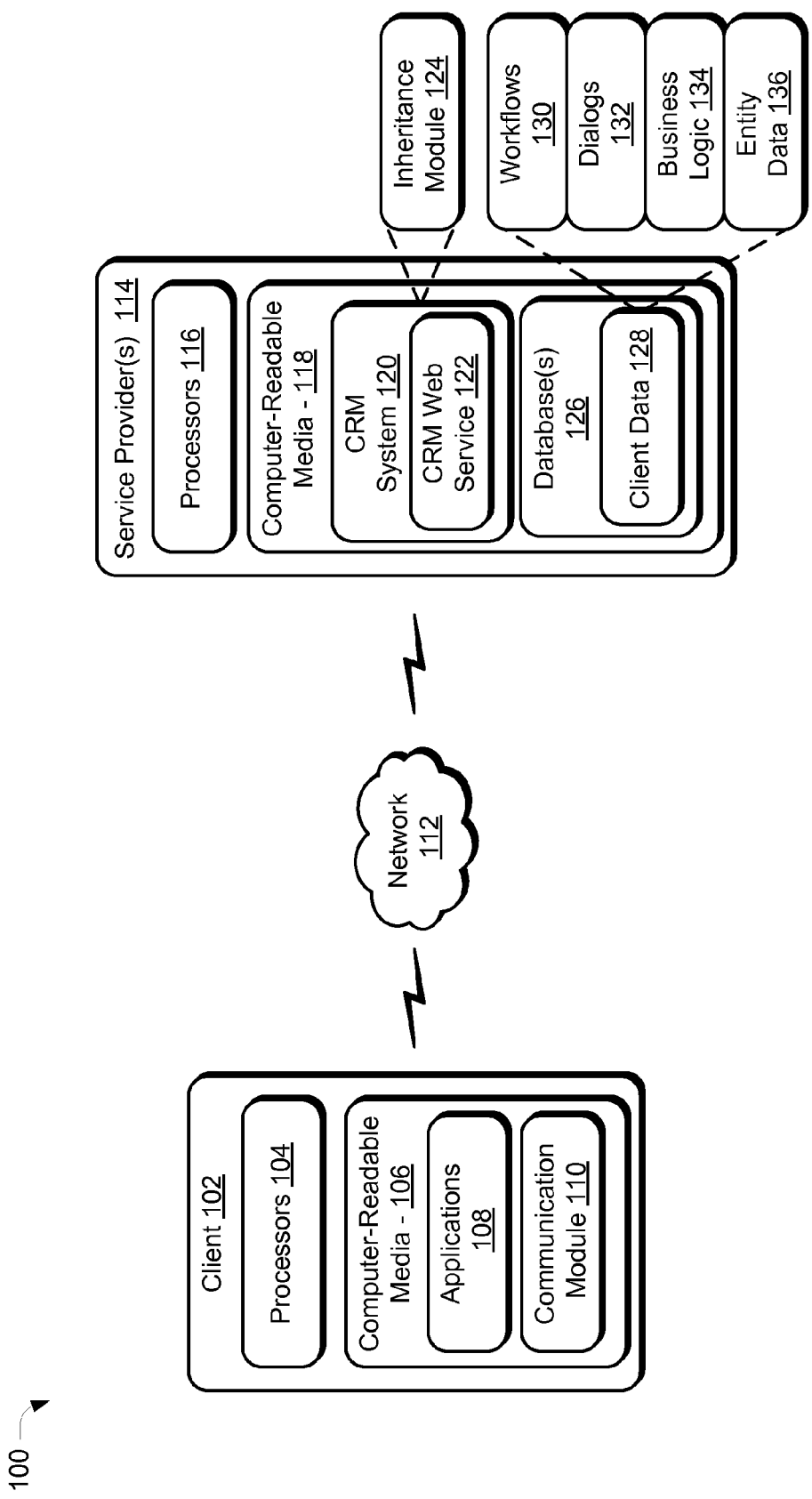
FIG. 1 illustrates an operating environment in which various principles described herein can be employed in accordance with one or more embodiments.

FIG. 1 illustrates an operating environment in accordance with one or more embodiments, generally at 100. Environment 100 includes a client 102 having one or more processors 104, one or more computer-readable media 106 and one or more applications 108 that reside on the computer-readable media and which are executable by the processor(s). The client 102 can be embodied as any suitable computing system and/or device such as, by way of example and not limitation, a desktop computer, a portable computer, a handheld computer such as a personal digital assistant (PDA), a cell phone, a set-top box, and the like. One example of a computing system that can represent various systems and/or devices including the client 102 is shown and described below in FIG. 7.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 7.

In addition, client 102 includes a software application in the form of a communication module 110. The communication module 110 represents functionality of the client 102 operable to communicate with and interact with various other entities (e.g., other clients, providers, servers, web sites). For example, the communication module 110 may be configured as a web browser through which various web pages or other user interfaces can be accessed. Interactions with other entities can include sending and receiving electronic messages in various forms (e.g., e-mail, instant messages, application specific notifications, text messages, and so forth) between the entities, obtaining resources (e.g., content and services) from the other entities, and so forth.

For instance, the client 102 can be communicatively coupled over a network 112, such as the Internet, with one or more service providers 114 from and to which content can be received and sent. The service providers 114 are each depicted as having one or more processors 116 and one or more computer-readable media 118. A service provider 114 can be implemented by way of one or more server devices. Accordingly, various example components represented and described for a service provider 114 can be included on a single server device and/or can be divided between multiple different server devices.

The service provider 114 is depicted as including a customer relationship management (CRM) system 120. The CRM system 120 represents functionality operable by a service provider 114 to provide various CRM related resources to the client 102 over the network 112. For example, the CRM system 120 can include or otherwise make use of CRM web service 122 to provide various resources to assist clients in management of business processes, including but not limited to sales opportunities, product marketing, service calls, and so forth. The CRM web service 122 can include or make use of a navigation manager configured to facilitate navigation of clients 102 to access various user interfaces that enable interaction with the various resources. The CRM system 120 provides a set of standard resources that clients 102 may take advantage to manage the business processes as well as custom and customizable resources that clients can adapt to fit particular operating procedures, processes, product characteristics, personnel structures, and other custom practices.

In at least some embodiments, the CRM system 120 makes resources available by way of web pages, Hypertext Markup Language (HTML) pages, application user interfaces, or other user interfaces that are communicated over the network 112 via the CRM web service 122 for output by the client 102. The CRM system 120 can manage access to the resources, performance of the resources, configuration of user interfaces or data to provide the resources, and so on. The client 102 can access the user interfaces via a communication module 110, such as a browser. One or more applications 108 can also be configured to access user interfaces and/or other CRM related resources. For example, a personal information management (PIM) client application or other desktop application 108 can make use of a CRM add-in that interacts with the CRM system 120 to obtain CRM related resources. In a particular example, a PIM client application can be employed to facilitate scheduling of actions, tasks, calls, and/or other events associated with particular CRM cases/projects that are assigned to particular users for completion. One example of a PIM client application is Microsoft Outlook®.

In addition, the CRM system 120 can include or otherwise make use of an inheritance module 124. The inheritance module 124 is representative of functionality to implement an inherited entity storage model described above and below. For example, the inheritance module 124 can be configured to output user interfaces to facilitate creation of entities based on other entities, such that a custom entity inherits some or all of the attributes, properties, and/or behaviors of a parent entity. In at least some embodiments, the inheritance module 124 is configured to create a custom entity in a common table with the parent entity upon which the custom entity is based. This approach can reduce storage requirements, enable unified searching, and/or speed up data operations.

In particular, CRM system 120 with the aid of the inheritance module 124 can manage one or more databases 126 configured to store a variety of different client data 128 related to business processes of clients 102 that make use of the CRM system 120. As depicted in FIG. 1, client data 128 can include workflows 130, dialogs 132, business logic 134, and entity data 136.

Workflows 130 represent automated and/or asynchronous flows that can be run to completion without relying upon user inputs. The workflows 130 define a set of actions to complete for a particular business process case or project. A workflow 130 therefore represents a structure or template that can be triggered to automatically manage actions for a corresponding business process. In general, the workflow 130 operates in connection with a particular case or record for a business process to control the flow of actions from initiation to completion of the instance. This can include triggering and assigning actions including dialogs 132 to personnel as appropriate along the way. Workflows 130 are therefore configured to automate back-end processing for corresponding business processes in accordance with business logic 134.

Dialogs 132 represent interactive or synchronous processes that involve user inputs to run to completion. The dialogs 132 can relate to various interaction activities defined by a business process and controlled by a workflow. A dialog can include interactive questions, answers, selections, and so forth that are designed to guide a user in completing one or more tasks in connection with the business process record. The dialog 132 therefore facilitates completion of front-end interaction activities that are driven by user inputs for a corresponding business process. For instance, a dialog can be implemented as a wizard-like interface that steps a user through a set of actions and pages to complete an assigned task, such as a sales follow-up call in the above example of a potential sales opportunity.

Business logic 134 represents business specific logic that can be used to drive workflows 130 and/or define custom activities, dialogs 132, tasks, and so forth. Different business logic 134 is typically associated with each particular business customer that uses the CRM system 120. Thus, business logic 134 can represent data that defines the structure, steps, flow, and/or personnel involved in business processes for a business customer.

Entity data 136 represents data that defines various entities and relationships between entities. Entities represent a set of business records having similar properties, attributes, behaviors and so forth. An entity can be stored as records in one or more tables, such as in the databases 126. By way of example and not limitation, entities can be defined to represent business contacts, employees, customers, email, activities, appointments, orders, accounts, orders, invoices, and other kinds of entities typically associated with business processes. The entity data 136 taken as a whole defines the structure of the databases 126 in the CRM system 120. As noted, an entity can be created to inherit some or all of the attributes, properties, and/or behaviors of a parent entity, details of which can be found in relation to the following figures.

Having described an example operating environment, consider now a discussion of some inherited entity storage model examples in accordance with one or more embodiments.

Inherited Entity Storage Model Examples

In one or more embodiments, an inherited entity storage model can be implemented by a CRM system 120 to facilitate creation of entities based on other entities. For example, the CRM system 120 via the CRM web service 122 can output configuration user interfaces designed to enable customers to design business processes, select and configure different entities for the business processes, set-up workflows, and so forth. As part of designing a business process scenario, customers can make use of an inheritance module 124 to create custom entities that inherit other "parent" entities. For example, an appointment entity for appointment data can be created to inherit from an activity entity designed generally to encompass various different activities in the CRM system 120. Rather than creating a new separate table to store data related to the appointment entity, the appointment entity can be created within an existing table for the activity entity. The appointment entity can share at least some fields with the activity entity. For example a subject field, a date field, and/or a time field can be shared. This can be accomplished by mapping select fields that are similar between entities one to another and combining these in a common table. In addition, at least some new fields specific to the appointment entity can be added to the existing table, such as a required attendees field, and appointment duration field, and an organizer field, to name a few examples. Accordingly, custom entities can be created by leveraging existing entities that share at least some similar attributes, properties, and/or behaviors.

Inheritance Definitions and Storage Structure

In this context, consider the following discussion of inherited entity storage model examples that illustrated aspects of entity inheritance. Initially, a few terms related to the inherited entity storage model are defined. As noted an entity in a CRM system represents a set of business records having similar properties. An entity can have a physical storage in the form of one or more database tables. An attribute represents a property of an entity. An attribute for an entity has a physical storage in the form of a database table column and/or corresponding database field.

Inheritance as used herein refers to scenarios in which a custom entity is defined/created to inherit some or all of the attributes of another entity. In this case, the entity from which attributes are inherited is referred to as an inherited entity or a parent entity. The custom entity that inherits attributes from a parent entity can also be referred to as an inheriting entity. Further, a root-level entity is defined as an inherited entity that is not also an inheriting entity.

Figure 2:
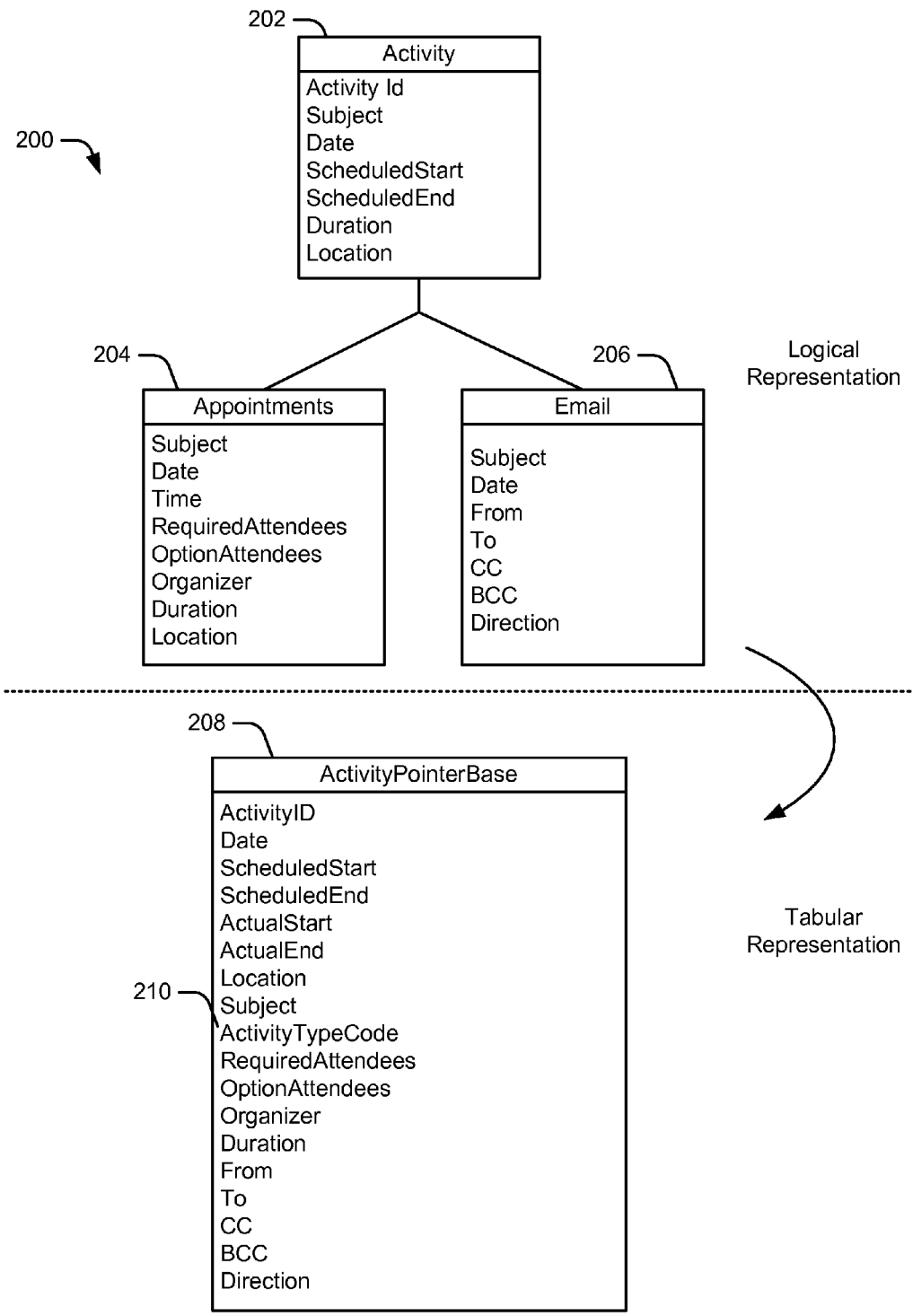
FIG. 2 illustrates an example database representation in accordance with one or more embodiments.

FIG. 2 illustrates generally at 200 an example database representation in accordance with one or more embodiments. In particular, FIG. 2 depicts a logical representation and tabular representation of an example activity entity 202 and entities that inherit the activity entity 202. For example, an activity entity 202 can be defined that contains attributes like subject, scheduled start, duration, location, and so forth. There can be many other entities defined in a CRM system that can inherit attributes of the activity entity and can also define additional attributes. For example, entities for appointments, tasks, fax, email, and so forth can be created as inheriting entities that inherit attributes of the activity entity. As noted, in accordance with the inherited entity storage model, these inheriting entities can be defined within the same table as the inherited activity entity.

In FIG. 2, examples of an appointments entity 204 and an email entity 206 that are defined to inherit from the activity entity are depicted. In the logical representation, each entity has particular attributes/fields that define the entity. The tabular representation depicts entity storage via a common table 208. For instance, the common table 208 is represented in FIG. 2 by an example ActivityPointerBase table that is configured to include the activity entity 202, as well as an example appointments entity 204 and an example email entity 206 that inherit from the activity entity 202. To do so, fields that are the same or similar between these entities, such as subject and date fields, can be mapped to common fields in the common table 208. In addition, the common table 208 can be modified to accommodate custom entities by including custom fields for the custom entities, such as an organizer field in the case of the appointments entity 204 and from/to fields in the case of the email entity 206.

In addition, an object type code 210 can be included in the common table 208 that relates data records to a corresponding entity. For instance, a data type code 210 is represented in FIG. 2 by an example ActivityTypeCode in the common table 208 for the activity entity. In this case, the ActivityTypeCode can be configured to indicate whether a particular record corresponds to the activity, appointment, or email entities of the logical view.

Moreover, an object type code 210 can be employed to filter the common table 208 and construct views over the table for the purpose of various data operations. The object type code 210 can be defined to differentiate entities from one another in the common table 210. For example, the logical representation can be obtained based on the object data type code 210 and applied to data stored commonly in the common table 208 to provide views for a selected entity. Such views for a selected entity are configured to show fields, labels, data, and so forth that are relevant for the selected entity. In effect, the logical representation can be applied to filter the common table 208 for selected entities. One or more data operations can then be performed upon a selected entity using a corresponding constructed view to filter the table to provide the relevant data corresponding to the selected entity.

Unified Storage

Thus, in accordance with the preceding example, a table can be configured to represent an entity, such as the example activity entity. Traditionally, separate additional tables were defined for other inheriting entities to store particular attributes for these entities. Accordingly, different tables would traditionally be created to store data for the appointments and email entities. Additionally, there could be even more tables to store the extension attributes to enable customization of the entities. Logical views were defined for each inherited entity using joins between the various tables to represent the entity record abstracting the underlying heterogeneous storage in multiple tables.

In accordance with the inherited entity storage model described herein, storage of inherited and corresponding inheriting entities can be unified via a common table. This model enables unified searching across entities, faster data operations, and reduced storage through the elimination of multiple tables and/or redundant fields. More generally, the inherited entity storage model implements (1) CRM system enhancements to support inherited and inheriting entities in the common database table (2) entity creation in accordance with the model and (3) flexible entity representation. Each of these aspects is discussion in turn in the following discussion.

CRM System Enhancements

Various enhancements enable support for inherited and inheriting entities. For example, inherited entity storage model defines particular metadata concepts and tags for inherited and inheriting entities. Some of the metadata concepts are defined at the entity level. For instance, "IsInheritedFrom" is a tag defined to indicate whether an entity is an inherited entity. Likewise, "InheritsFrom" is a tag which is defined to indicate an ID of an entity from which one or more attributes are inherited. When "InheritsFrom" is set to an ID of a particular entity, this indicates that the entity including the tag is an inheriting entity and that it inherits from the entity having the specified ID. These entity level tags can be employed to set inheritance relationships overall (e.g., globally) for an entity.

Other metadata concepts and corresponding tags are defined at the attribute level. Tags at the attribute level can be employed to enable customization of inheritance for particular attributes individually. For instance, at the attribute level, "InheritsFrom" is a tag which is defined to indicate an ID of an attribute that is inherited. When "InheritsFrom" is set to an ID of a particular attribute, this indicates that the attribute is an inheriting attribute and that it inherits from the attribute having the specified ID.

An "IsStoredOnPrimaryTable" tag is defined to indicate a storage location for an attribute. For example, if "IsStoredOnPrimaryTable" is set to true this indicates that the attribute is stored on the entity's primary table and if false indicates that the attribute is stored via a secondary table. By default this value is set to true so that attributes will be stored together in the common table by default. In some instances, secondary tables can be used for some customized business scenarios and the "IsStoredOnPrimaryTable" tag can be employed to enable customizations to create or change some attributes such that these attributes are stored via secondary tables.

An "IsInheritanceTypeAttribute" tag is defined to indicate which attribute of an entity, if any, is an attribute representing the object type codes of the different entities represented in that table. This tag can correspond to the object type code 210 discussed in relation to FIG. 2. For activities in an activity table, the tag corresponds to the ActivityTypeCode. This tag can act as a discriminating attribute to differentiate between different records related to different entities that are stored in a common table.

"TableColumnName" is tag which specifies a name for a column in the table in which an attribute can be found. The "TableColumnName" can be a field that is separate from and can have different values than a "PhysicalName" tag, which represents the name of the attribute on the logical view as opposed to the table itself. By default, the "TableColumnName" is configured to be the same as "PhysicalName." The "TableColumnName" enables names for entity views to be different than the names used within the common table. Thus, an attribute mapped to a common field in the common table can be displayed with a different name that is specific to the logical entity view. Additionally, attributes having similar or same names can be represented in the common table with distinct names.

With the foregoing in mind, the following provides but one example of code structure that can be used to implement inherited and inheriting entities using the enhancements just described. In particular, the following example illustrates one way in which an appointment entity that inherits from an activity entity can be implemented. Portions of the following code example are underlined to highlight particular features:

```
<entity Name="Appointment">
    <EntityId>95e930c5-812a-44e8-85c9-154cd5f59465</EntityId>
    <ObjectTypeCode>4201</ObjectTypeCode>
    <CollectionName>Appointments</CollectionName>
    <LogicalCollectionName>appointments</LogicalCollectionName>
    <BaseTableName>ActivityPointerBase</BaseTableName>
    <InheritsFrom>c821cd41-f315-43d1-8fa6-82787b6f06e7</InheritsFrom> //INHERITS FROM ACTIVITYPOINTER
    <IsCustomizable>1</IsCustomizable>
    <IsCollaboration>1</IsCollaboration>
    <IsConnectionsEnabled>1</IsConnectionsEnabled>
    <IsActivity>1</IsActivity>
    <ActivityTypeMask>1</ActivityTypeMask>
    <IsMappable>1</IsMappable>
    <IsImportable>1</IsImportable>
    <IsDuplicateCheckSupported>1</IsDuplicateCheckSupported>
    <OwnershipTypeMask>UserOwned</OwnershipTypeMask>
    <MobileAccessLevelMask>Homepage|RelatedEntity|Read</MobileAccessLevelMask>
    <IsAudited>1</IsAudited>
    <IsReplicated>1</IsReplicated>
    <IsReplicationUserFiltered>1</IsReplicationUserFiltered>
    <IsValidForAdvancedFind>1</IsValidForAdvancedFind>
    <ExtensionTableName>AppointmentBase</ExtensionTableName>
    <ReportViewName>FilteredAppointment</ReportViewName>
    <IsRenameable>1</IsRenameable>
    <CanTriggerWorkflow>1</CanTriggerWorkflow>
    <CanBeChildInCustomRelationship>1</CanBeChildInCustomRelationship>
    <CanBeInCustomReflexiveRelationship>1</CanBeInCustomReflexiveRelationship>
    <CanBeSecured>1</CanBeSecured>
    <EntityClassName> Crm.Entities.Appointment</EntityClassName>
    <EntityAssembly> Crm.Entities</EntityAssembly>
    <ServiceClassName> Crm.ObjectModel.AppointmentService</ServiceClassName>
    <ServiceAssembly> Crm.ObjectModel</ServiceAssembly>
    <WorkflowSupport>15</WorkflowSupport>
    <LocalizedNames>
        <LocalizedName id="985011ad-2241-db11-898a-0007e9e17ebd" description="Appointment" languagecode="1033" />
    </LocalizedNames>
    <LocalizedCollectionNames>
        <LocalizedCollectionName id="995011ad-2241-db11-898a-0007e9e17ebd" description="Appointments" languagecode="1033" />
    </LocalizedCollectionNames>
    <Descriptions>
        <Description id="975011ad-2241-db11-898a-0007e9e17ebd" description="Commitment representing a time interval with start/end times and duration." languagecode="1033" />
    </Descriptions>
    <attributes>
        <attribute PhysicalName="ActivityId"> // PRIMARY KEY
            <Type>primarykey</Type>
```

-continued

```
            <IsNullable>0</IsNullable>
            <ValidForCreateApi>1</ValidForCreateApi>
            <ValidForReadApi>1</ValidForReadApi>
            <IsPKAttribute>1</IsPKAttribute>
            <EntityId>95e930c5-812a-44e8-85c9-154cd5f59465</EntityId>
            <AttributeId>2823622d-fc29-4812-aa8e-6dab4a721c5e</AttributeId>
            <AttributeTypeId>00000000-0000-0000-00aa-110000000032</AttributeTypeId>
            <ColumnNumber>30</ColumnNumber>
            <DisplayMask>ValidForAdvancedFind|RequiredForGrid</DisplayMask>
            <Descriptions>
                <Description id="3340b506-2341-db11-898a-0007e9e17ebd" description="Unique identifier of the appointment." languagecode="1033" />
            </Descriptions>
            <InheritsFromId>55b1f1b0-cd0b-4d74-b7b7-147182841d04</InheritsFromId>
            <ImeMode>auto</ImeMode>
            <RequiredLevel>systemrequired</RequiredLevel>
            <Format />
            <displaynames>
                <displayname id="3240b506-2341-db11-898a-0007e9e17ebd" description="Appointment" languagecode="1033" />
            </displaynames>
        </attribute>
        <attribute PhysicalName="ActivityTypeCode"> // DIFFERENTIATOR ATTRIBUTE
            <Type>picklist</Type>
            <IsNullable>0</IsNullable>
            <DefaultValue>(4201)</DefaultValue>
            <ValidForReadApi>1</ValidForReadApi>
            <EntityId>95e930c5-812a-44e8-85c9-154cd5f59465</EntityId>
            <AttributeId>043dc966-67ba-4dcd-bd12-1b9b4f339978</AttributeId>
            <AttributeTypeId>00000000-0000-0000-00aa-110000000030</AttributeTypeId>
            <ColumnNumber>74</ColumnNumber>
            <DisplayMask>ObjectTypeCode|ValidForAdvancedFind|ValidForGrid</DisplayMask>
            <Descriptions>
                <Description id="28dc96d1-d1f5-4999-ae40-4a2c18b0cda0" description="Type of activity." languagecode="1033" />
            </Descriptions>
            <InheritsFromId>b4c87384-6d95-451d-bcd9-b58a4c9d8a8f</InheritsFromId> // INHERITED ATTRIBUTE
            <IsInheritanceTypeAttribute>1</IsInheritanceTypeAttribute>
            <ImeMode>auto</ImeMode>
            <RequiredLevel>systemrequired</RequiredLevel>
            <Locked>1</Locked>
            <Format />
            <AppDefaultValue>4201</AppDefaultValue>
            <OptionSetName>activitypointer_activitytypecode</OptionSetName>
            <OptionSetId>a4092cfa-4fae-416d-af8d-795aa36ebb8b</OptionSetId>
            <displaynames>
                <displayname id="fbeae849-da07-4726-97ef-72720cf29d13" description="Activity Type" languagecode="1033" />
            </displaynames>
        </attribute>
        <attribute PhysicalName="Location">
            <TableColumnName>ApptLocation</TableColumnName> // ATTRIBUTE OF INHERITING ENTITY
            <Type>nvarchar</Type>
            <Length>400</Length>
            <ValidForCreateApi>1</ValidForCreateApi>
            <ValidForUpdateApi>1</ValidForUpdateApi>
            <ValidForReadApi>1</ValidForReadApi>
            <EntityId>95e930c5-812a-44e8-85c9-154cd5f59465</EntityId>
            <AttributeId>20bcdae4-0c92-4a8b-a909-4947b27b909c</AttributeId>
            <AttributeTypeId>00000000-0000-0000-00aa-11000000001e</AttributeTypeId>
            <ColumnNumber>22</ColumnNumber>
            <DisplayMask>ValidForAdvancedFind|ValidForForm|ValidForGrid</DisplayMask>
            <Descriptions>
                <Description id="2f40b506-2341-db11-898a-0007e9e17ebd" description="Location where the appointment is to occur." languagecode="1033" />
            </Descriptions>
            <ImeMode>auto</ImeMode>
            <RequiredLevel>none</RequiredLevel>
            <Format>text</Format>
            <MaxLength>200</MaxLength>
            <displaynames>
                <displayname id="2e40b506-2341-db11-898a-0007e9e17ebd" description="Location" languagecode="1033" />
            </displaynames>
        </attribute>
    </attributes>
</entity>
```

Notice that the example code above illustrates a number of the metadata concepts and tags as discussed previously. For instance, an inherits from activity pointer in the form <InheritsFrom>ID</InheritsFrom> designates an ID of an entity from which the appointments entity inherits. An activity ID attribute indicated by a tag in the form of <attribute PhysicalName="ActivityId"> acts as a primary key for the appointments entity. An attribute for an object type code 210 as described above is indicated by a tag in the form <attribute PhysicalName="ActivityTypeCode">. This attribute acts as a differentiator attribute to identify a particular entity corresponding to a record and differentiate from multiple entities that can be maintained in the common table 208. An inherits from ID attribute in the form <InheritsFromID>ID</InheritsFromID> represents an attribute that is inherited from another entity. An appointment location attribute indicated by a tag in the form <TableColumnName>ApptLocation</TableColumnName> represents a custom attribute that is particular to the inheriting entity. In other words, the appointment location attribute is not inherited. Thus, a column and/or field is created specifically for the location attribute.

Entity Creation

Entities can be created in accordance with the foregoing principles to take advantage of the inherited entity storage model. For instance, the example ActivityPointerBase table of FIG. 2 represents a parent activity entity that is inherited, as well as corresponding inheriting entities appointments, email, and so forth. Various logical representation views can be configured to filter and/or fetch data from a subset of columns that exist in the ActivityPointerBase table. This can include filtering the columns using selected values for an object type code. Apart from the case of customization, the logical representation views do not result into table joins. In the case of customization, additional extension tables like an EmailExtensionBase table and/or an Appointment ExtensionBase table can be defined to store some customized fields and columns if appropriate. Generally, though, custom entities that inherit from a parent are accommodated within a common table structure along with the parent entity that is inherited.

With this model, a search on a common attribute is performed via the one common table. Therefore, separate search queries for each entity can be eliminated. Depending upon the number of inheriting entities, this can result in a substantial reduction in the number of queries used to perform a given search. Further, creation of a custom entity does not result in creation of a new table or index. The records of newly created inheriting entities will be stored in the common table along with other inheriting entity records. Moreover, queries can be designed to retrieve data directly from the common table without requiring table joins. Thus, retrievals can be very fast with properly defined indexes. Because data is residing in a single table, a single indexing strategy suffices for an inherited entity and its corresponding inheriting entities.

Flexible Representation

A definition of an entity per the foregoing can include not just the specifics of the entity itself, but also the entity's attributes and relationships to other entities. Thus, an entity can be considered to encompass an entire logical object including related attributes and relationships. Taken together, these objects can be commonly referred to as "metadata." Attributes and relationships themselves may have associated metadata, which can also considered part of the overall entity definition.

Figure 3:
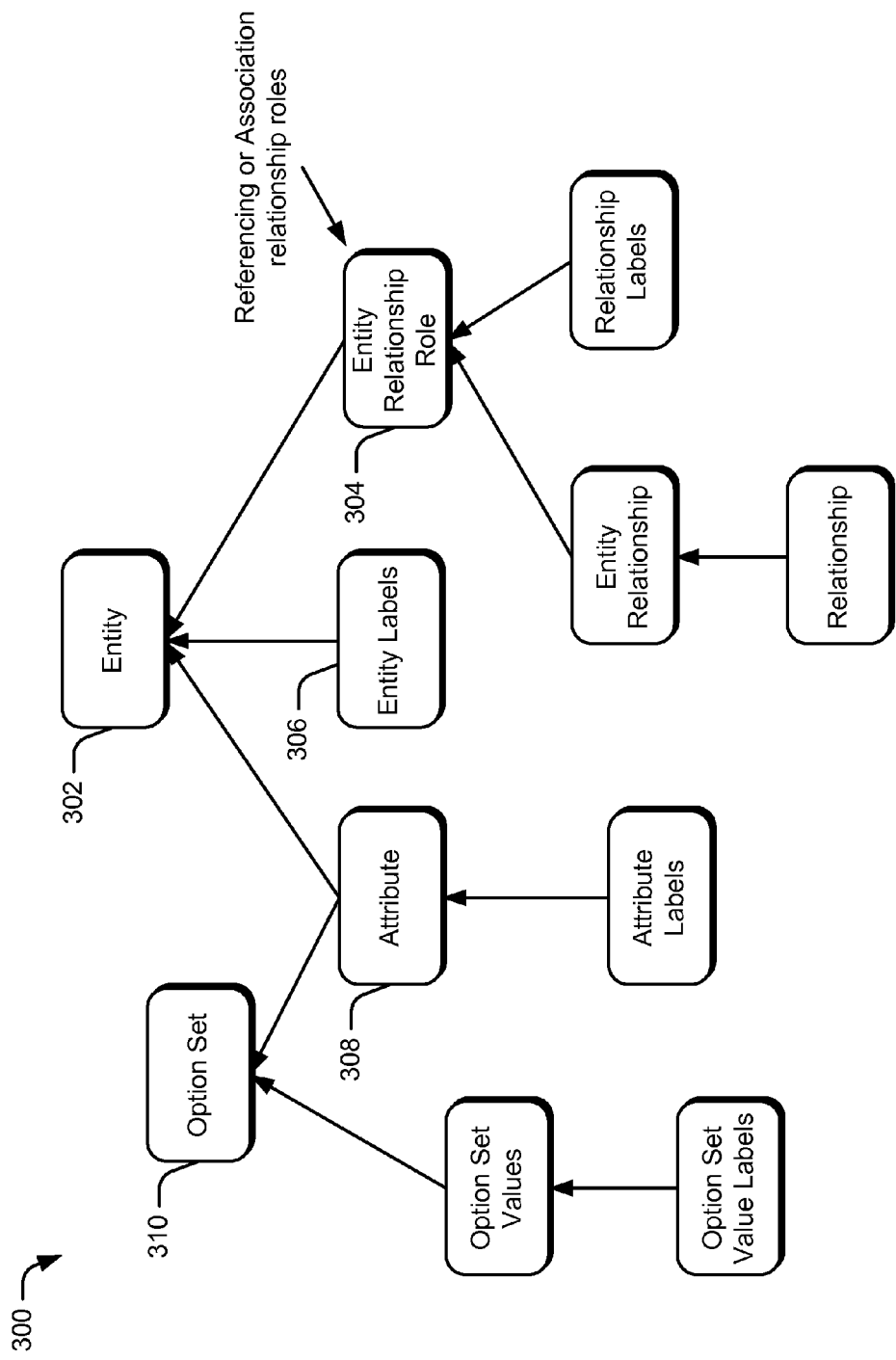
FIG. 3 illustrates an example entity definition in accordance with one or more embodiments.

FIG. 3 depicts generally at 300 a representation of an example entity 302 that is defined to encompass various metadata. In particular, FIG. 3 represents a set of metadata objects that define the entity 302. The metadata objects can include relationships 304 of the entity to other entities, labels 306, attributes 308, attribute option sets 310 and so forth. Note that the depicted relationships 304 are indicated for relationships roles of the entity that are "referencing" or "association" roles. In other words, the entity 302 is either the "many" side in a one-to-many relationship or is one of the two entities in a many-to-many relationship.

The descriptions of entity, attribute, and relationship objects can also be stored in the database. These descriptions can include specifics about the physical storage properties of each entity, attribute, or relationship (e.g. table names, column names, column types, and foreign key names), as wells specific behavioral properties of each entity, attribute, or relationship. For example, entities may or may not be configured to participate in CRM workflows and/or may or may not be made available offline or to mobile clients. Further, attributes can have different minimum and maximum values, data types and/or lengths. Such specific behavioral properties can vary between each individual entity and each attribute.

Entity inheritance adds a potential complication to this model. A newly created inheriting entity could be configured to inherit the metadata defined for the inherited entity directly. While such a model is suitable, this approach has some rigidity because specific behavioral properties of each inheriting piece of metadata is inherited directly. Thus, behaviors of the inheriting entities in this approach are designated to be the same as the inherited entity. For example, if activity entity is set to support workflows, the appointment entity which inherits from activity would by definition inherit support for workflows. In this model, disabling support for workflows for the appointment activity also disables workflow support for the activity entity, as well as for other entities inheriting from the activity entity.

In at least some embodiments, a flexible approach is employed that enables behavioral properties to be independently altered. In this approach, behavioral properties can vary between the inherited and inheriting entities. To do so, the inherited entity metadata is configured to act as a "template." The metadata of the inherited entity is copied and used as the basis for the definition of the new inheriting entity. This new entity will therefore have duplicated metadata that is associated with the inherited entity. This can occur in the same manner for the both the direct inheritance and flexible inheritance approaches just described.

However, in the flexible approach, support is provided to enable alteration of the duplicated metadata independent of the inherited entity. For instance, the inheritance module 124 can be configured to enable independent management of attributes. For example, the "Subject" attribute is an attribute that can be inherited between the activity entity and each inheriting entity. Customization features implemented via the inheritance module 124, though, can enable a different maximum length for this attribute to be set for each inheriting entity.

Creation of an inheriting entity's definition based on an inherited entity's "template" definition can be facilitated by metadata code classes and structure defined for the model. Some examples of metadata code classes defined to implement the model include the following:

MetadataBusinessEntity: This class represents a set of name-value pairs mapping metadata object properties to values.

MetadataBusinessEntityMoniker: This class represents an identifier for a metadata object and includes that metadata object's ID as well as its type (Entity, Attribute, Relationship, etc.)

EntityMetadataDefinition: This class represents the full definition of an entity as described by a entity definition diagram.

EntityMetadataDefinitionDatabasePopulator: This class is configured to populate an EntityMetadataDefinition for entities in the database.

EntityMetadataDefinitionInheritanceCopier: This is configured to take a populated EntityMetadataDefinition and create a duplicate version of the EntityMetadataDefinition for an inheriting entity.

MetadataInheritanceCopier: This is an abstract class supporting a common "CopyData" method which different metadata object type copy classes can override to perform copying logic specific to particular metadata object types.

Each piece of metadata (entities, attributes, relationships, etc.) can be assigned a unique ID in the database. When metadata for an entity is duplicated, each new piece of "duplicated" metadata is assigned a new ID. Any references and/or relationships defined between metadata objects are also assigned new IDs.

For example, an attribute associated with an entity is associated with an ID of the entity. When the entity definition is inherited to a new entity and therefore duplicated, a new ID is assigned and subsequent attributes that are copied also have the value of the ID changed to that of the new entity. The inheritance module 124 can be configured to handle the complexities of creating new IDs for pieces of metadata and resolving ID references between the different pieces of metadata as described above and below. This can be done by calling specific metadata-type copiers in a designated order and maintaining throughout the copying process a dictionary or table to map old metadata IDs to new metadata IDs.

Figure 4:
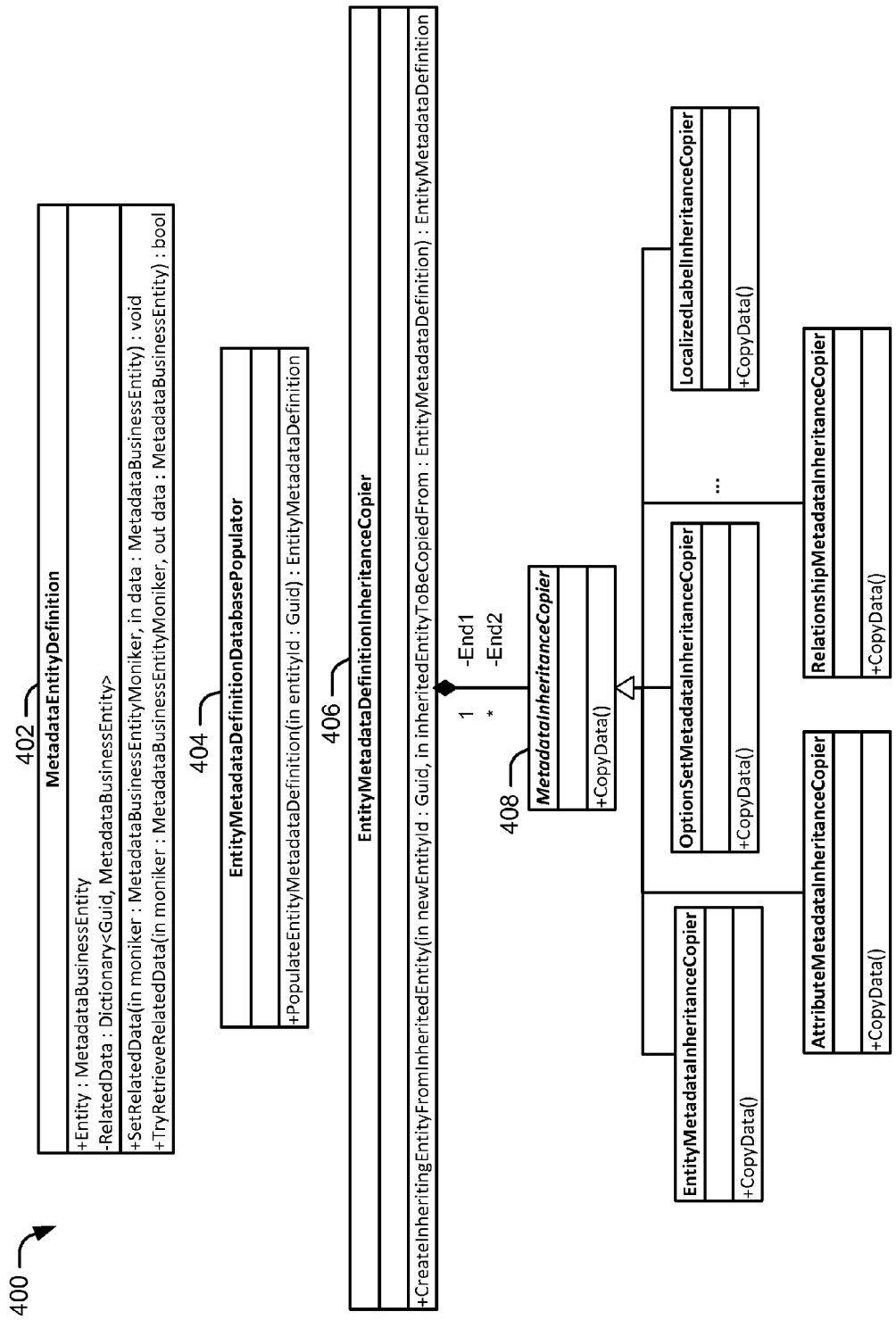
FIG. 4 illustrates an example metadata class structure in accordance with one or more embodiments.

FIG. 4 depicts generally at 400 an example representation of metadata classes in accordance with one or more embodiments of the inherited entity storage model. The example representation includes example representations of the EntityMetadataDefinition 402, EntityMetadataDefinitionDatabasePopulator 404, EntityMetadataDefinitionInheritanceCopier 406, and the MetadataInheritanceCopier 408. These classes or equivalent components can be employed by the inheritance module 124 to perform operations to copy an entity definition from one entity to another, e.g., from a parent entity to a custom entity. In general, the copying operation can include forming a entity object for the entity to be copied, populating the object with metadata for the entity, and duplicating the object created for the inherited entity to create the inheriting entity.

More particularly, an object can be created for the inherited entity in accordance with the EntityMetadataDefinition 402. The object creation can be initiated via a create inheriting entity function provided via the inheritance module 124. The created object can be populated with corresponding metadata using the EntityMetadataDefinitionDatabasePopulator 404. This can involve calling a populate function implemented by the populator. The populate function is configured to retrieve metadata objects defining an entity and place that data into the EntityMetadataDefinition object for the entity.

When the object is populated, a call can be made to invoke an inheritance copier function implemented by the EntityMetadataDefinitionInheritanceCopier 406. The inheritance copier function is configured to create a dictionary, table, index or other suitable data to map the inherited entity's metadata object IDs to new IDs assigned for the inheriting entity created. The inheritance copier function, also creates a new EntityMetadataDefinition object to represent the new inheriting entity.

The inheritance copier function is further configured to create instances of specific metadata object inheritance copiers and call them in the topological order defined for an entity. For instance, the topological order can be defined/represented by a metadata object relationship diagram such as the example in FIG. 3. Invoking the inheritance copier function to iterate through the specific metadata object inheritance copiers in topological order ensures that for each object created, the dictionary or other mapping data is populated with a mapping for references by that object to other objects higher up in the relationship tree.

Then, for each specific metadata object inheritance copier, the definition of the metadata object is copied and a new ID is assigned to the duplicate object created. The new ID of this new metadata object is added to the mapping dictionary. For each ID reference in the new metadata object, the mapping dictionary is employed to map old IDs to the new IDs in the new metadata object. Finally, the new metadata object is added to the new EntityMetadataDefinition object representing the new inheriting entity. Iterating through the various metadata objects in this manner produces the new inheriting entity having new IDs for various attributes that are mapped to the inherited parent entity as appropriate. Further details regarding techniques for creating custom entities based on parent entities can be found in relation to the following figures.

Having considered the above examples, consider now example procedures for an inherited entity storage model in accordance with one or more embodiments.

Example Methods

The following section provides a discussion of flow diagrams that describe steps of example methods for an inherited entity storage model in accordance with one or more embodiments. The methods can be implemented in connection with any suitable hardware, software, firmware, or combination thereof. In at least some embodiments, the methods can be implemented by way of a suitability configured computing device, such as the example service provider 114 of FIG. 1 that includes or otherwise makes use of a CRM system 120, CRM web service 122, and/or inheritance module 124.

Figure 5:
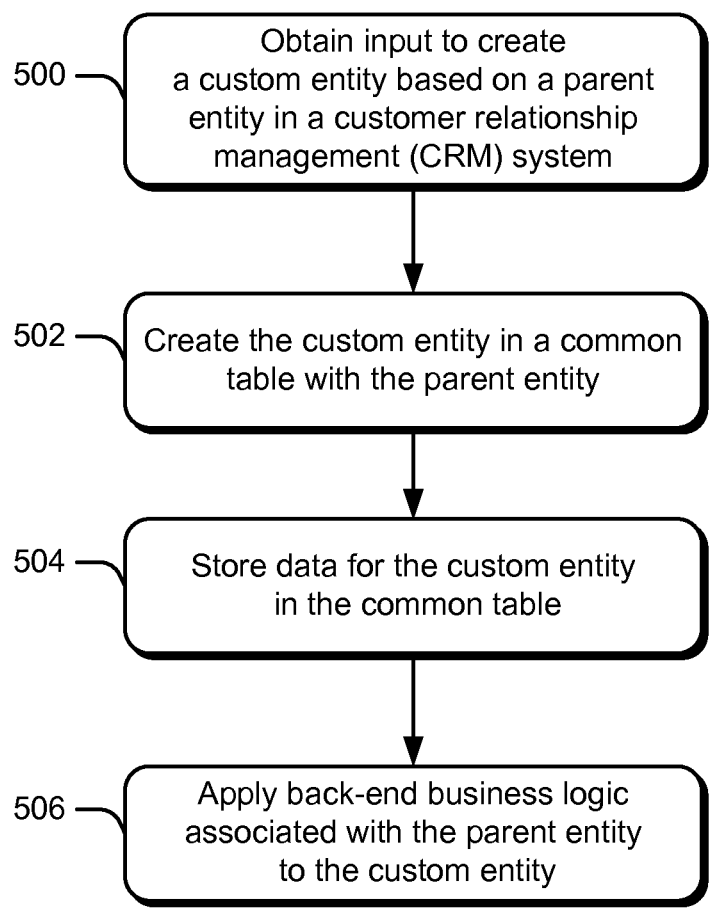
FIG. 5 is flow diagram that describes steps of a method in accordance with one or more embodiments.

FIG. 5 is a flow diagram that describes steps of a method in accordance with one or more embodiments. Step 500 obtains input to create a custom entity based upon a parent entity in a customer relationship management (CRM) system. For example, a client 102 can interact with the inheritance module 124 via the CRM web service 122 to access various configuration user interface made available via the CRM system 120. Various configuration user interfaces can be configured to enable customers to design business processes, select and configure different entities for the business processes, set-up workflows, and so forth. As part of designing a business process scenario, customers can make use of an inheritance module 124 to create custom entities that inherit other "parent" entities. This can occur through a wizard-like interface that enables a user to make selection to define entities, attributes for the entities, create columns and/or fields, and customize existing entities to fit the particular business process scenario. Accordingly, the inheritance module 124 can operate to obtain input from these configuration user interfaces to initiate creation of a custom entity based upon a parent entity. Responsive to this input, the inheritance module 124 can implement an entity creation process using the techniques described above and below.

In particular, step 502 creates the custom entity in a common table with the parent entity. This step can occur in any suitable way. In at least some embodiments, a custom entity can be created using the metadata code classes and corresponding operations described above in relation to FIG. 4. The custom entity can be created to inherit at least some attributes of the parent. If appropriate, the custom entity can also be defined to include custom attributes. These custom attributes can be represented in the common table along with inherited attributes and other attributes defined for the parent. Further examples of techniques that can be employed to create a custom entity from a parent can be found in relation to FIG. 6.

Once the custom entity is created, step 504 stores data for the custom entity in the common table. Accordingly, the databases 126 can be structured to store data for the custom entity along with the corresponding parent entity in a common table 208. As mentioned, this approach can result in less complex and faster searching, reduced storage requirements, and elimination of redundant data.

Step 506 applies back-end business logic associated with the parent entity to the custom entity. Here, logic defined for attributes that are inherited can be carried through to the custom entity. A variety of business logic 134 implemented via the CRM system 120 can be passed through inheritance. This can include such things as workflow rules, dialog triggers, settings, data field properties, data access rules, and so forth. For example, business logic 134 for activities of an activity entity can be defined to automatically schedule activities via a PIM client application. In this case, appointments for an appointment entity that inherits from the activity entity will also automatically be scheduled via the PIM client application. In another example, an activity dialog prompted by initiation of a new activity to facilitate data collection can also be prompted when an appointment is initiated based on an inheritance relationship between an appointment entity and the activity entity. In this way, back-end logic associated with a parent entity can automatically be passed to other entities based on inheritance relationships established in accordance with the inherited entity storage mode.

Figure 6:
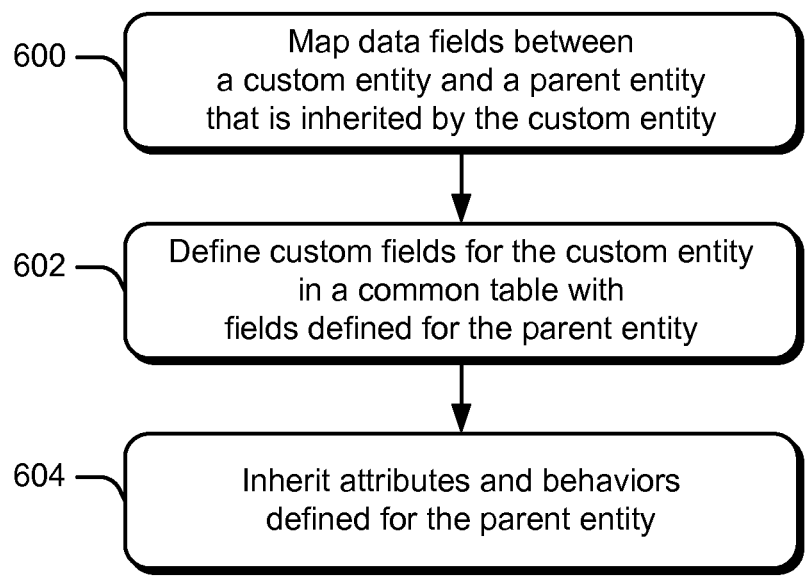
FIG. 6 is flow diagram that describes steps of another method in accordance with one or more embodiments.

FIG. 6 is a flow diagram that describes steps of another method in accordance with one or more embodiments. In particular, FIG. 6 depicts example operations that can occur to create a custom entity in a common table with a parent entity from which the custom entity inherits.

Step 600 maps data fields between a custom entity and a parent entity that is inherited by the custom entity. Data fields can be mapped one to another in any suitable way. For instance, data fields for same or similar attributes for entities can be ascertained through user input to relate various defined fields one to another. In this case, the same or similar attributes can be mapped and combined into common fields in the common table. In at least some embodiments, mapping can occur using metadata code classes and operations as described above in relation to FIG. 4. In this case, a mapping dictionary or other suitable data can be employed to map IDs for attributes of the parent entity to the new IDs for attributes of the custom entity.

Additionally, step 602 defines custom fields for the custom entity in a common table with fields defined for the parent entity. In this step, the common table can be configured to include custom fields that are not inherited from the parent. Such custom fields are added to the common table along with other existing fields for the parent entity. For instance, custom fields can be created in the common table for fields that are not mapped to common fields of the parent entity in the mapping performed in step 600. An object type code can also be set as a differentiator attribute to differentiate the custom entity and/or fields from the parent and/or other inheriting entities maintained within the common table. Setting the object type code can facilitate construction of logical views over the common table as described previously.

Step 604 inherits attributes and behaviors defined for the parent entity. Inheritance of attributes and behaviors can occur in various ways. For instance, metadata objects can be created and used to copy attributes to a new entity in the manner described in relation to FIG. 4. Moreover, behaviors including business logic 134 that is associated with attributes can be carried through with inherited attributes. This can involve using an entity definition for the parent as a template to construct the new entity. In one approach, attributes and behaviors associated with the parent are carried through by default when operations to copy the entity definition are performed.

As noted though, IDs can be assigned individually to duplicated attributes during the copy operations. The individual IDs assigned to various attributes and other metadata objects enable modifications to be made to attributes without changing underlying inherited attributes from which the attributes are defined. In one example of such modifications, a data type and/or a field size can be varied between an attribute for a custom entity and an attribute of the parent entity from which the attribute is inherited. The assignment of individual IDs effectively decouples the attributes and makes customization of this type possible. Accordingly, aspects of inherited attributes can be customized on an individual basis.

Having considered various example methods for an inherited entity storage model, consider now an example system that can be employed to implement various aspects of the inherited entity storage model in accordance with one or more embodiments.

Example System

Figure 7:
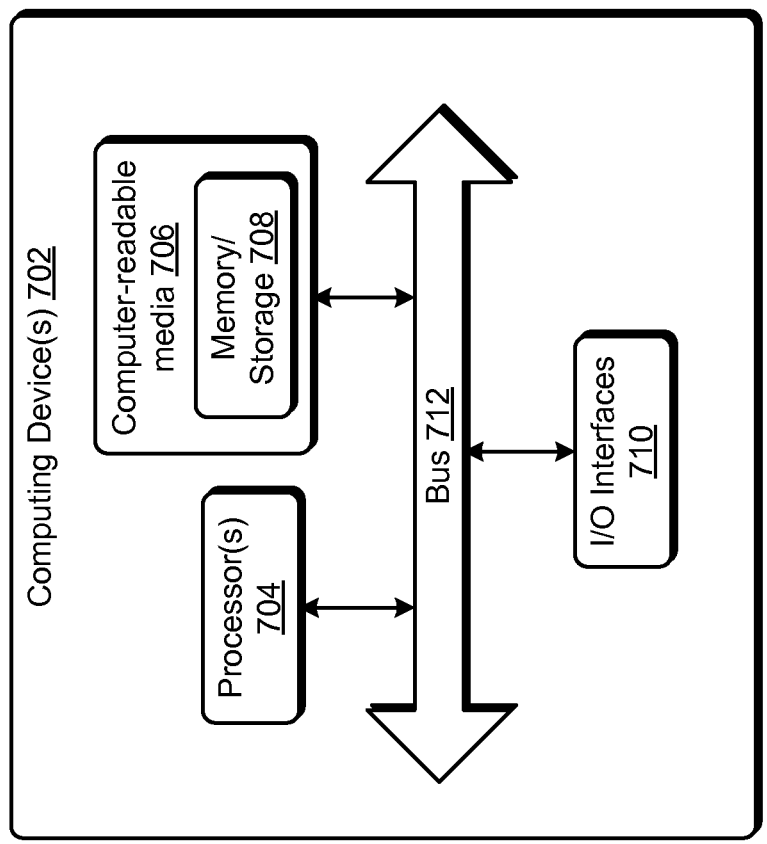
FIG. 7 illustrates an example computing system that can be used to implement one or more embodiments.

FIG. 7 illustrates an example system generally at 700 that includes an example computing device 702 that is representative of one or more such computing systems and/or devices that may implement the various embodiments described above. The computing device 702 may be, for example, a server of a service provider 114, a device associated with the client 102 (e.g., a client device), an on-chip system, and/or any other suitable computing device or computing system.

The example computing device 702 includes one or more processors 704 or processing units, one or more computer-readable media 706 which may include one or more memory and/or storage components 708, one or more input/output (I/O) interfaces 710 for input/output (I/O) devices, and a bus 712 that allows the various components and devices to communicate one to another. Computer-readable media 706 and/or one or more I/O devices may be included as part of, or alternatively may be coupled to, the computing device 702. The bus 712 represents one or more of several types of bus structures, including a memory bus or memory controller, a peripheral bus, an accelerated graphics port, and a processor or local bus using any of a variety of bus architectures. The bus 712 may include wired and/or wireless buses.

The one or more processors 704 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 708 represents memory/storage capacity associated with one or more computer-readable media. The memory/storage component 708 may include volatile media (such as random access memory (RAM)) and/or nonvolatile media (such as read only memory (ROM), Flash memory, optical disks, magnetic disks, and so forth). The memory/storage component 708 may include fixed media (e.g., RAM, ROM, a fixed hard drive, etc.) as well as removable media (e.g., a Flash memory drive, a removable hard drive, an optical disk, and so forth).

Input/output interface(s) 710 allow a user to enter commands and information to computing device 702, and also allow information to be presented to the user and/or other components or devices using various input/output devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software, hardware (fixed logic circuitry), or program modules. Generally, such modules include routines, programs, objects, elements, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. Computer-readable storage media also includes hardware elements having instructions, modules, and/or fixed device logic implemented in a hardware form that may be employed in some embodiments to implement aspects of the described techniques.

The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, hardware elements (e.g., fixed logic) of an integrated circuit or chip, or other storage device, tangible media, or article of manufacture suitable to store the desired information and which may be accessed by a computer.

"Communication media" may refer to a signal bearing medium that is configured to transmit instructions to the hardware of the computing device, such as via the network 112. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Combinations of any of the above are also included within the scope of computer-readable media. Accordingly, software, hardware, or program modules, including the CRM web service 122, inheritance module 124, and other components of a CRM system 120, applications 108, communication module 110, and other program modules, may be implemented as one or more instructions and/or logic embodied on some form of computer-readable media.

Accordingly, particular modules, functionality, components, and techniques described herein may be implemented in software, hardware, firmware and/or combinations thereof. The computing device 702 may be configured to implement particular instructions and/or functions corresponding to the software and/or hardware modules implemented on computer-readable media. The instructions and/or functions may be executable/operable by one or more articles of manufacture (for example, one or more computing devices 702 and/or processors 704) to implement techniques for an inherited entity storage model, as well as other techniques. Such techniques include, but are not limited to, the example procedures described herein. Thus, computer-readable media may be configured to store or otherwise provide instructions that, when executed by one or more devices described herein, cause various techniques for the inherited entity storage model.

CONCLUSION

Techniques for an inherited entity storage model have been described that can be employed to implement inherited entity management for a CRM system. In at least some embodiments, input can be obtained to create a custom entity that is based at least in part upon a parent entity. The custom entity is created to inherit the parent entity according to an inheritance relationship established between the entities. To do so, the custom entity is created from the parent entity in a common table with the parent entity using some common fields and defining custom fields as appropriate. Data for the entities is then stored via the common table. This approach can reduce storage requirements, enable unified searching, and speed up data operations. Further, back-end business logic associated with parent entity in the CRM system can be automatically applied to the custom entity based upon the inheritance relationship established between the entities.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer-readable storage media storing instructions, that when executed by a computing device, cause the computing device to implement a customer relationship management (CRM) 15 system configured to perform a method comprising:

obtaining input to create a custom entity based upon a parent entity in the CRM system;

creating the custom entity in a common table with the parent entity, the creating the custom entity comprising:

forming an entity object for the parent entity to be copied;

populating the entity object with metadata for the parent entity;

and duplicating the entity object for the parent entity to create the custom entity by invoking an inheritance copier function, the inheritance copier function configured to create one or more instances of specific metadata inheritance copiers, and call the one or more instances of specific metadata object inheritance copiers to copy the metadata that is populated in the entity object to corresponding objects for the custom entity;

the common table including at least one common data field between the custom entity and the parent entity that is inherited by the custom entity and at least one custom data fields for the custom entity that is not inherited from the parent entity, and the common table defining an object type code for the custom entity to differentiate the custom entity from other entities maintained in the common table;

applying business logic associated with the parent entity to the custom entity, the business logic defining a workflow that is configured to automate a set 5 of actions defined for a business process that involves data corresponding to the parent entity;

and wherein the inheritance copier function is further configured to call the one or more instances of specific metadata object inheritance copiers by calling the one or more instances of specific metadata object inheritance copiers in a topological order defined for the parent entity to copy the metadata that is populated in the entity object to corresponding objects for the custom entity.

2. The one or more computer-readable storage media of claim 1, wherein creating the custom entity in the common table with the parent entity further comprises: inheriting attributes and behaviors defined for the parent entity.

3. The one or more computer-readable storage media of claim 1, wherein the custom entity is configured to inherit one or more attributes defined for the parent entity.

4. The one or more computer-readable storage media of 20 claim 1, wherein obtaining the input to create the custom entity comprises: outputting a configuration user interface configured to enable customers to design a business process in the CRM system; and receiving input through the configuration user interface to define the custom entity for the business process as an inheriting entity that inherits one or more attributes from the parent entity.

5. A computer implemented method comprising:
obtaining input to create a custom entity based upon a parent entity in a customer relationship management (CRM) system;
creating the custom entity in a common table with the parent entity by:
forming an entity object for the parent entity to be copied;
populating the entity object with metadata for the parent entity;
and duplicating the entity object for the parent entity to create the custom entity by
invoking an inheritance copier function, the inheritance copier function configured to create one or more instances of specific metadata inheritance copiers, and call the one or more instances of specific metadata object inheritance copiers to copy the metadata that is populated in the entity object to corresponding objects for the custom entity;
the common table including at least one common data field between the custom entity and the parent entity that is inherited by the custom entity and at least one custom data fields for the custom entity that is not inherited from the parent entity, and the common table defining an object type code for the custom entity to differentiate the custom entity from other entities maintained in the common table;
and applying business logic associated with the parent entity to the custom entity, the business logic defining a workflow that is configured to automate a set 5 of actions defined for a business process that involves data corresponding to the parent entity;
wherein the inheritance copier function is further configured to call the one or more instances of specific metadata object inheritance copiers by calling the one or more instances of specific metadata object inheritance copiers in a topological order defined for the parent entity to copy the metadata that is populated in the entity object to corresponding objects for the custom entity.

6. The computer implemented method of claim 5, wherein obtaining the input to create the custom entity comprises: outputting a configuration user interface configured to enable customers to design a business process in the CRM system; and receiving input through the configuration user interface to define the custom entity for the business process as an inheriting entity that inherits one or more attributes from the parent entity.

7. The computer implemented method of claim 5, further comprising: assigning unique IDs to each item of metadata that is I copied from the parent entity to the custom entity.

8. The computer implemented method of claim 5, wherein the custom entity is configured to inherit one or more attributes defined for the parent entity.

9. The computer implemented method of claim 5, further comprising: constructing a logical view over the common table to represent data fields corresponding to the custom entity; and performing one or more data operations upon the custom entity using the constructed logical view to provide data corresponding to the custom entity.

10. A customer relationship management (CRM) system comprising: one or more processors; and one or more computer-readable storage media storing instructions, that when executed by the one or more processors, cause the CRM system to implement an inheritance module configured to perform acts comprising:
obtaining input to create a custom entity defined to inherit one or more attributes of a parent entity in the CRM system;
creating the custom entity in a common table with the parent entity by at least:
forming an entity object for the parent entity to be copied;
populating the entity object with metadata for the parent entity;
duplicating the entity object for the parent entity to create the custom entity by invoking an inheritance copier function, the inheritance copier function configured to create one or more instances of specific metadata inheritance copiers, and call the one or more instances of specific metadata object inheritance copiers to copy the metadata that is populated in the entity object to corresponding objects for the custom entity;
the common table including at least one common data fields between the custom entity and the parent entity that is inherited by the custom entity and at least one custom data field for the custom entity that is not inherited from the parent entity, and the common table defining an object type code for the custom entity to differentiate the custom entity from other entities maintained in the common table;
applying business logic associated with the parent entity to the custom entity, the business logic defining a workflow that is configured to automate a set of actions defined for a business process that involves data corresponding to the parent entity;
and wherein the inheritance copier function is further configured to call the one or more instances of specific metadata object inheritance copiers by calling the one or more instances of specific metadata object inheritance copiers in a topological order defined for the parent entity to copy the metadata that is populated in the entity object to corresponding objects for the custom entity.

11. The customer relationship management (CRM) system of claim 10, wherein obtaining the input to create the custom entity comprises: outputting a configuration user interface configured to enable customers to design a business process in the CRM system; and receiving input through the configuration user interface to define the custom entity for the business process as an inheriting entity that inherits one or more attributes from the parent entity.

12. The customer relationship management (CRM) system of claim 10, wherein the inheritance module is further configured to perform acts comprising: assigning unique IDs to each item of metadata that is copied from the parent entity to the custom entity to enable modification of attributes defined for the custom entity on an individual basis.

13. The one or more computer-readable storage media of claim 1, wherein the business logic comprises one or more workflow rules, dialog triggers, settings, data field properties, or data access rules.

14. The computer implemented method of claim 5, wherein the business logic is associated with a business customer that uses the CRM system, and wherein the business logic is useable to drive workflows or define custom activities for the business customer.

15. The one or more computer-readable storage media of claim 1, wherein the CRM system is configured to perform a method further comprising: constructing a logical view over the common table to represent data fields corresponding to the custom entity; and performing one or more data operations upon the custom entity using the constructed logical view to provide data corresponding to the custom entity.

* * * * *